G. A. ETSLER.
CAR FENDER.
APPLICATION FILED OCT. 8, 1908.
938,994.
Patented Nov. 2, 1909.
2 SHEETS—SHEET 2.
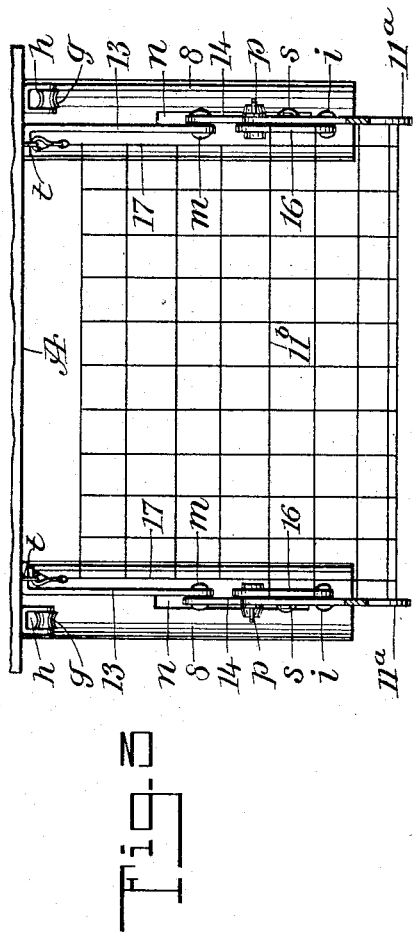
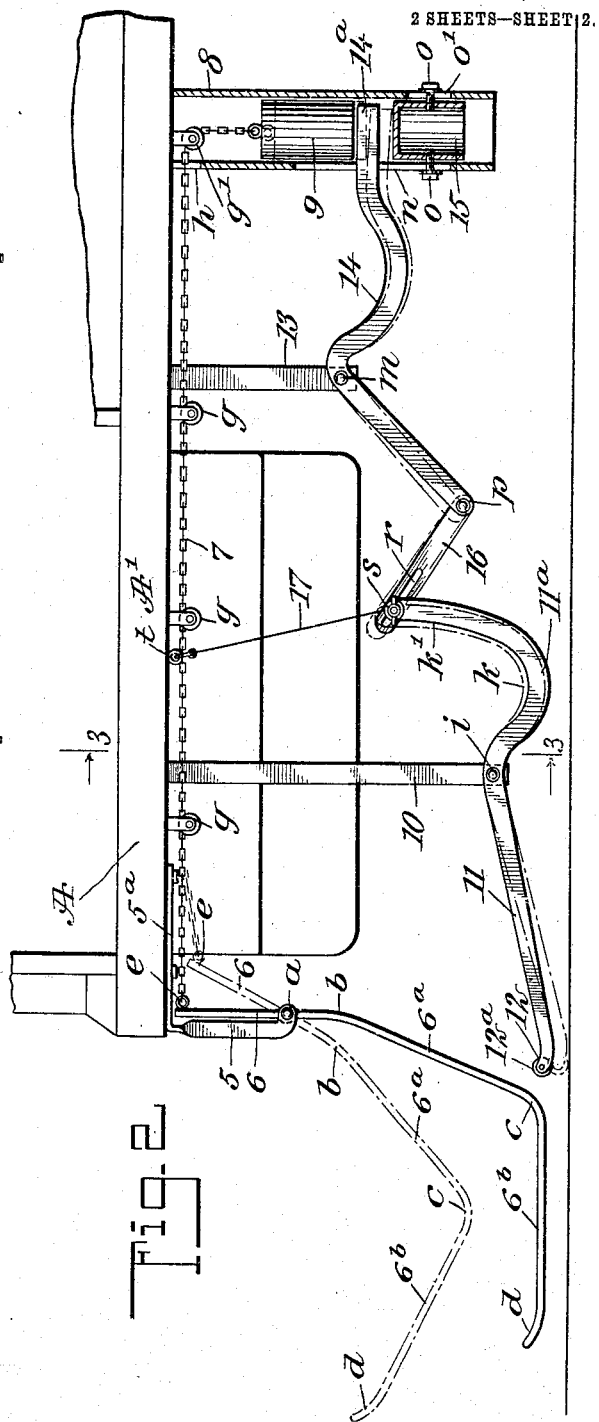
WITNESSES
J. S. Brophy
Wm. P. Patton
INVENTOR
George A. Etsler
BY
ATTORNEYS

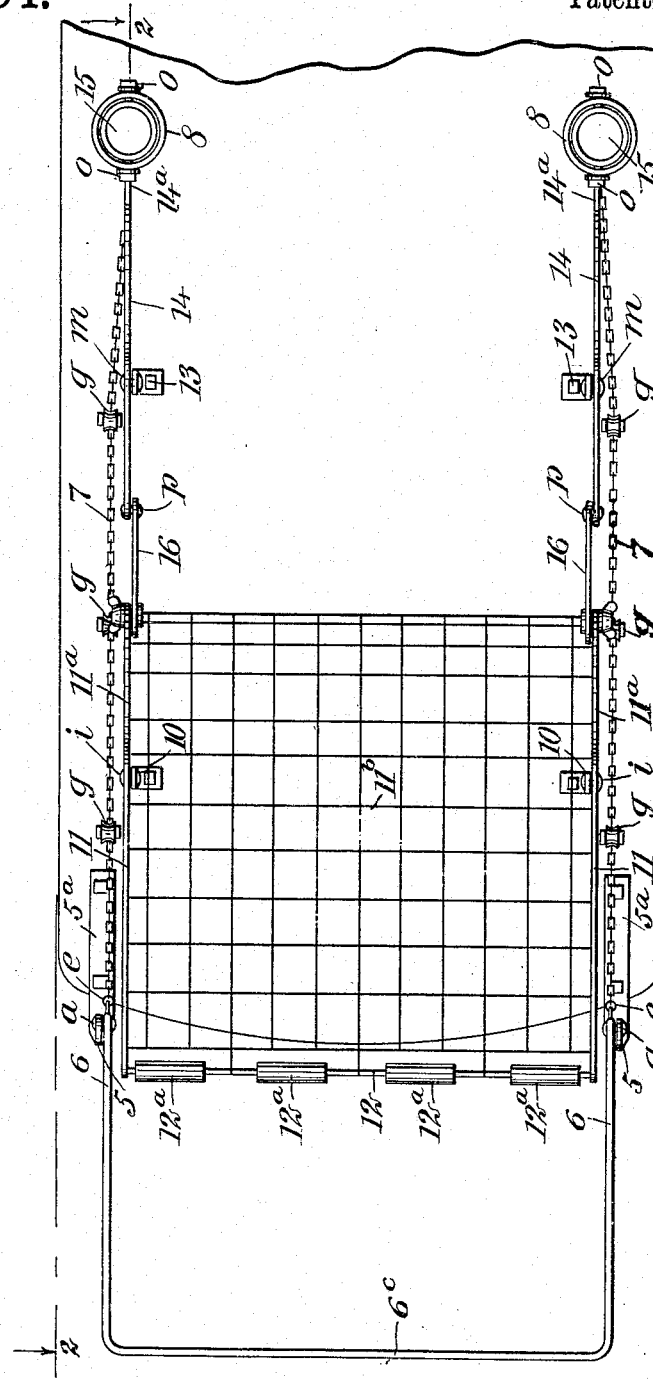

UNITED STATES PATENT OFFICE.

GEORGE A. ETSLER, OF STANDISH, MICHIGAN.

CAR-FENDER.

938,994.

Specification of Letters Patent.

Patented Nov. 2, 1909.

Application filed October 8, 1908. Serial No. 456,707.

*To all whom it may concern:*

Be it known that I, GEORGE A. ETSLER, a citizen of the United States, and a resident of Standish, in the county of Arenac and State of Michigan, have invented a new and Improved Car-Fender, of which the following is a full, clear, and exact description.

This invention relates to car fenders of a type in which a catching and supporting means is employed, for preventing injury to a person with whom the fender has forcible contact, and the purpose of the invention is to provide novel details of construction for a car fender of the type indicated, which are simple, durable and very effective in service, and which may be placed on street or other cars for service, without requiring changes in the construction of the cars.

The invention consists in the novel construction and combination of parts, as is hereinafter described, and defined in the appended claims.

Reference is to be had to the accompanying drawings forming a part of this specification, in which similar characters of reference indicate corresponding parts in all the views.

Figure 1 is a reversed plan view of a car body and of the improved car fender mounted thereon; Fig. 2 is a partly sectional side view, substantially on the line 2—2 in Fig. 1, and Fig. 3 is a transverse, partly sectional view of details taken substantially on the line 3—3 in Fig. 2.

In the drawings, A indicates a car bottom frame, whereon the improved fender is secured and wherefrom it depends. Briefly described, the improved car fender comprises the following novel association of elements: A rockable catcher apron, having a concaved receptacle on its rear portion, is suspended from the bottom of a car frame; a tripping frame is pivoted on depending arms at the front and near the catcher apron, weights are hung from the ends of flexible connections at the rear of the catcher apron, said connections extending forward into engagement with the upper ends of the side bars of the tripping frame, and links and levers are rockably supported from the car frame between the catcher apron and the weights, and at their forward ends are pivoted upon the rear portion of the receptacle, said levers at their rear ends extending below and into loose engagement with the weights.

In operation, an object on the car track approached by the tripping frame, will raise said frame, and slacken the flexible connections, which will lower the weights correspondingly, these in turn will depress the rear ends of the levers and elevate the rear edge of the catcher apron, thus depressing its front edge for reception of the object that has passed beneath the tripping frame, said object sliding on the apron rearward and into the receptacle, that is, into the rear portion of the apron.

Specifically described, the improved car fender embodies the following described parts, and their novel combination:

Two similar L-shaped bracket arms 5, 5 are provided, the horizontal members $5^a$ of which are secured upon side timbers A' of the car frame A, thus disposing the arms proper pendent from the car frame at the forward end thereof, as shown for one arm in Fig. 2. The tripping frame hereinbefore mentioned, consists of two side bars having their upper portions 6, 6 pivotally secured on the depending portions of the bracket arms 5, 5, as shown at $a$. Below the pivots $a$, an obtuse, angular bend $b$ is formed in each side bar, thus inclining an intermediate portion $6^a$ of each side bar forwardly and downwardly, said portions terminating at $c$, where an obtuse, angular bend is formed therein, thus projecting the remaining portion $6^b$ of each side bar forwardly in a normally horizontal plane. At the front end of each side bar member $6^b$, said members are slightly curved upward, as shown at $d$ for one member in Fig. 2, and, as represented in Fig. 1, the front ends of the similar side bars are connected and the bars spaced apart parallel with each other, by an integral cross bar $6^c$. The upper ends of the side bar portions 6 are disposed near to and below the side timbers A' of the car frame, and upon said ends $e$ the forward ends of two flexible connections, such as chains 7, are secured. From the points $e$ the chains or like connections 7 trend rearward, in engagement with bracketed pulleys $g$, that are affixed upon the lower sides of the timbers A' and are thus supported for free longitudinal movement.

At an equal distance from the front end of the car frame A, two similar cylindrical casings 8, 8 are secured upon the car bottom, and project downward near the sides of the car frame, said casings each having a short slot $h$ in its side wall near the upper end and at the front side thereof. One of the bracketed pulleys *g* is positioned pendent in the upper portion of each casing 8 and an end portion of a respective chain 7 is passed through the slot *h* and over the pulley from which it hangs, the extremity of each chain being attached to the upper end of a preferably cylindrical weight 9 that is thus hung in the casing 8. The heft of the weights 9 is such that they nearly counterbalance the weight of the tripping frame members that are disposed below the pivots *a*, so that said portions of the tripping frame while normally disposed as shown by full lines in Fig. 2, will, if slightly pressed upon on the lower side of the front edge, rise into the position indicated in the same view by dotted lines.

At the rear of and near the tripping frame, the catcher apron, which is a main detail of the invention, is positioned. As shown in Figs. 1 and 2, two similar hanger bars 10 are projected downward parallel with each other at opposite points on the car frame timbers A', these hanger bars having pivoted connection at *i* upon the side bars of the catcher apron.

As shown for one side bar of the apron in Fig. 2, said portion thereof consists of a flat metal bar of a suitable width that tapers edgewise slightly from the pivot connection *i*, and at the front end is bent upward somewhat, thus affording a forward frame member 11. Rearward from the pivot connection *i* each side bar 11 is curved edgewise downwardly, rearwardly and then upwardly, thus producing a rearward extension 11$^a$ thereon, which is concaved considerably on the upper edge *k*, and thence curves upward toward the rear end as shown at *k'* in Fig. 2. A transverse shaft 12 is extended between the front ends of the members 11, and upon said shaft at intervals similar rollers 12$^a$ are mounted, as shown in Fig. 1. Upon the upper edges of the completed side bars 11, 11$^a$ a stout wire woven fabric 11$^b$ is stretched and secured, thus completing an apron forward of the hanger bars 10, and a basket-like receptacle rearward thereof that is an extension of the apron.

Upon the car timbers A' between the casings 8 and the rear end of the receptacle on the catcher apron, two hanger bars 13 are secured by their upper ends, and depend from said timbers, having less length than the hanger bars 10. Two similar levers 14, bent somewhat edgewise, as shown in Fig. 2 for one bar, are respectively pivoted at *m* near their longitudinal centers upon the lower ends of the hanger bars 13. The rear end 14$^a$ of each lever 14 projects through a vertical slot *n* formed in a respective casing 8 and has contact with the lower end of the weight 9, that hangs therein. In each casing 8 below the end portion of the lever 14, an abutment block 15 is adjustably secured; preferably the blocks 15 are hollow to reduce their weight, and are each engaged by set screws *o* that project through opposite slots *n*, *o'*, in the casing 8, an adjustment toward or from a respective end portion of each lever being thus permitted.

Upon the forward ends of the similar levers 14 which are inclined downward from the pivots *m*, the rear ends of two link bars 16 are respectively pivoted, as shown at *p* in the drawings. Each link bar is in the form of a flat, elongated strip of metal, and is formed with a longitudinal slot *r* which extends of a proper length from a point near the front end thereof. The link bars 16 incline upwardly and forwardly from their pivots *p*, and are respectively lapped upon the rear ends of the rear members 11$^a$ of the side bars for the catcher apron hereinbefore described, and said lapped members and ends of the links are pivoted together by bolts *s*, that pass through washers thereon that are seated on the slotted ends of the links, said bolts also passing through the slots *r* and perforations in the side bar members 11$^a$.

From the upper end of each side bar member 11$^a$, the lower end of a flexible connection that may be a wire rod 17, extends upwardly, and at their upper ends said connections are attached to a clevis loop that is pivoted upon a grooved pulley *t*, that seats upon a respective chain 7, and it will be seen that these wire rods afford support to the rear end of the catcher apron, their length being such that the shaft 12 and rollers 12$^a$ will be elevated a short distance from the car track, due to the weight of the catcher receptacle and the attachments thereon.

It will also be noted that the weight imposed upon the links 16 and forward portions of the levers 14, normally rocks the rear ends of said levers into engagement with the weights 9, which latter co-act with the levers and link bars, so that the forward ends of the link bars are held from depression below a predetermined point, and it will be noted that by changing the positions of the pivot bolts *s* in the slots *r*, which are clamped on the portion *k'* and the link 16 so as to alter the length of the links 16, the rollers 12$^a$ will be correspondingly raised or lowered.

Assuming that the working details of the device are adjusted as shown in Fig. 2, the operation of the fender will be essentially as follows: If an object, such as a person, is prostrated upon the car track, in front of a car having the improved fender thereon, and said car is moving rapidly toward the person so that it cannot be stopped in time and an impingement of the fender thereon results, the tripping frame at its front transverse bar 6$^c$, rides upon the person and is rocked upward into the position shown by dotted lines in Fig. 2. This will incline the upper members 6, 6 of the side bars rearwardly, which will permit the weights 9 to drop and press the rear ends of the levers 14 down until arrested by the abutment blocks 15, and it will be seen that the depression of the rear ends of the levers 14 will correspondingly raise the rear end of the catcher apron and receptacle thereon, which will rock the rollers 12$^a$ into an engagement with the track. The progressive movement of the car and fender will cause the front end of the apron to slide under the prostrate body and permit the tripping frame to drop into normal position, raising the weights 9, which will allow the receptacle at the rear of the catcher apron to assume its normal lower position. The forward motion of the car will be adapted to cause the prostrated body to slide rearward and be arrested in the receptacle, and as there is no projection which could impinge upon the body when the apron receives the same, serious injury is not liable to occur.

Having thus described my invention, I claim as new and desire to secure by Letters Patent:

1. In a car fender, the combination with a tripping frame, bracket arms on a car frame upon which the upper portions of the tripping frame are pivoted, and flexible connections extended rearward on the car frame, of counterbalancing weights on the rear ends of the flexible connections, said weights being depressed when the tripping frame is rocked upward.

2. In a car fender, the combination with a car frame, depending bracket arms thereon, and a tripping frame pivoted near the upper ends of its side bars on said arms, of a catcher apron pivoted on hanger arms projected downward from the car frame, said frame having a concaved receptacle on its rear end, two flexible connections supported on the car frame, two casings depending from said car frame at the rear ends of the flexible connections, weights secured on the rear ends of the flexible connections and slidably housed in the casings, link bars and levers rockably supported from the car frame, the ends of the link bars being pivoted on the ends of the levers, the forward ends of the link bars being adjustably pivoted on the rear portion of the catcher apron, the rear ends of the levers engaging the lower ends of the weights, and abutment blocks in the casings below the inserted ends of the levers.

3. The combination with the car, of a tripping frame supported thereby, a counterbalance in connection with the upper end of the tripping frame, an apron supported by the car, and means whereby the movement of the counterbalance to trip the frame will lower the forward edge of the apron.

4. The combination with the car, of a tripping frame supported thereby, a counterbalance in connection with the upper end of the tripping frame, an apron, and means whereby the tripping of the frame will lower the apron.

5. The combination with the car, a tripping frame supported thereby, a weight behind the tripping frame, a flexible connection between said frame and the weight, means on the car for supporting the connection to permit it to move longitudinally, an apron, and means whereby the tripping of the frame will lower the apron.

In testimony whereof I have signed my name to this specification in the presence of two subscribing witnesses.

GEORGE A. ETSLER.

Witnesses:
B. J. HENDERSON,
MAUDE BUTLER.